United States Patent [19]

Rouly et al.

[11] Patent Number: 4,690,050

[45] Date of Patent: Sep. 1, 1987

[54] TRANSFER SYSTEM FOR ARTICLE PRINTING MACHINE

[75] Inventors: Eric Rouly, Pontault Combault; Jean-Louis Dubuit, Paris; Gilles Marette, Coulommiers, all of France

[73] Assignee: Societe d'Exploitation des Machines Dubuit, Paris, France

[21] Appl. No.: 796,775

[22] Filed: Nov. 12, 1985

[30] Foreign Application Priority Data

Nov. 13, 1984 [FR] France ............................... 84 17301

[51] Int. Cl.[4] ...................... B41F 17/20; B65G 47/52

[52] U.S. Cl. .................................. 101/35; 198/346.2; 198/408; 198/468.01; 198/468.11; 198/470.1; 269/237; 294/118

[58] Field of Search ..................... 101/38 R, 38 A, 39, 101/40, 126; 198/408, 346.2, 470.1, 803.9, 468.01, 468.11; 269/237, 239; 294/118

[56] References Cited

U.S. PATENT DOCUMENTS

| | | | |
|---|---|---|---|
| 2,484,671 | 10/1949 | Baumann | 101/124 |
| 3,181,457 | 5/1965 | Eldred et al. | 101/124 |
| 3,198,308 | 8/1965 | Driesch et al. | 198/468.01 |
| 3,220,344 | 11/1965 | Hagerman | 101/124 |
| 3,237,555 | 3/1966 | Jones et al. | 101/38 |
| 3,311,051 | 3/1967 | Rudolph | 101/40 |
| 3,737,050 | 6/1973 | Leeuwestein | 198/408 X |

FOREIGN PATENT DOCUMENTS

| | | | |
|---|---|---|---|
| 1378101 | 10/1964 | France . | |
| 2526710 | 11/1983 | France | 101/40 |
| 160778 | 7/1979 | Netherlands | 198/408 |

*Primary Examiner*—Clifford D. Crowder

*Attorney, Agent, or Firm*—Charles E. Brown; Charles A. Brown

[57] ABSTRACT

In this printing machine, which is of the type comprising a horizontal printing station and, in vertical alignment with the latter, an exchange station, there are two transfer arms which are disposed at 90° relative to each other, one on each side of a rotation axis inclined at 45° which is common to them, in a plane containing the latter, and which occupy alternately a vertical position at the exchange station and a horizontal position at the printing station, and the holding means equipping each of these transfer arms for grasping an object to be printed comprises at least one clamp the two branches of which are each provided at their free end with a jaw adapted to encircle at least partially, in conjunction with the jaw of the other one, an object of this kind.

23 Claims, 9 Drawing Figures

TRANSFER SYSTEM FOR ARTICLE PRINTING MACHINE

The present invention is generally concerned with printing objects of all kinds, and is more particularly but not necessarily exclusively directed to printing bottles.

For certain specific applications, and this is the case in a glassworks, for example, it is desirable that the bottles arrive vertically at the printing station at which they are to be processed, being transported for this purpose by appropriate conveyor means.

As a corollary to this, they should preferably be printed when horizontal, especially when printing is by silkscreening, printing in the vertical position possibly leading to unwanted running of the applied ink and in itself entailing the use of complex and costly resources.

Finally, after printing, the objects concerned must be replaced on conveyor means adapted to convey them towards another processing station, a drying station, for example, and it is again desirable that they be once more conveyed vertically by such conveyor means.

At present, the operations needed to transfer them from a vertical position to a horizontal position and then from this horizontal position to a new vertical position are more often than not carried out manually.

Apart from the fact that this implies the continuous mobilization of an operator, the rate of working can only be moderate, in the order of 1000 units per hour.

It has therefore been proposed to mechanize these transfer operations.

One known solution in this area consists in using an arm which is fitted with a clamp adapted to hold an object to be printed and to which the rotational, pivoting and translation movements necessary to achieve the required transfer are imparted.

The mechanization of such movements is inevitably somewhat complex.

The rate of working achieved is therefore relatively low, still in the order of 1000 units per hour, without it being actually possible to avoid the necessity for the presence of an operator in any case.

In the highly specific case of printing simple capsules or caps, there has been proposed the use of a transfer arm over the end of which may be sleeved a capsule or cap of this kind and which is mounted to rotate about an axis inclined at 45°, so that this transfer arm is thus adapted to occupy alternately a position in line with a loading and unloading station and another position vertically aligned with the printing station.

A solution of this kind evidently is not suited to the printing of bottles conveyed vertically by conveyor means.

For such bottles there has been proposed, in particular by U.S. Pat. No. 3,311,051, a solution consisting in the use, in the manner of the links of a chain, of a plurality of two-element holding devices, in practice a cone and cup, adapted to grasp such bottles individually, one at a time, with, in the corners of the corresponding loop, transfer devices with the axis inclined at 45° adapted to move the bottles thus gripped by such holding devices from a vertical position to a horizontal position and vice versa.

However, a solution of this kind necessitates the costly employment of a relatively high number of holding devices, which are already costly in themselves, and the weight of which results in an undesirable increase in the mass to be driven.

Using a carrousel instead of simple arms as means for achieving transfer between an exchange station serving as a loading and unloading station, on the one hand, and a printing station, on the other hand, the printing machine described in U.S. Pat. No. 3,220,344 is particularly complex and costly, all the more so in that, for the purpose of holding a plurality of objects to be printed, in practice bottles, the carrousel comprises a plurality of holding devices each adapted to grasp an object of this kind, all these holding devices being cone and cup type holding devices.

By virtue of its complexity, which is far from negligible, a printing machine of this kind is not well suited to small scale series production.

A general object of the present invention is an arrangement which, while providing a simple and efficacious means of achieving the necessary transfer, is of a kind adapted to eliminate the disadvantages succinctly described hereinabove.

More precisely, the object of the present invention is a printing machine of the kind comprising a horizontal printing station to co-operating with conveyor means disposed at a level below that of said printing station and at least one transfer arm which is equipped with holding means adapted to support an object to be printed and which, mounted to rotate about an axis inclined at 45°, is able to occupy alternately two positions, one in vertical alignment with the conveyor means and the other in vertical alignment with the printing station, in combination with, on the one hand, a first transfer means adapted to pass an object to be printed from said conveyor means to an exchange station, in order for the object to be printed to be grasped by the transfer arm, and, on the other hand, a second transfer means adapted to pass from the exchange station to the conveyor means an object already printed previously put down by the transfer arm, characterized in that there are two transfer arms disposed at 90° relative to each other, one on each side of their common rotation axis and in a plane containing the latter, and which alternately occupy a vertical position at the exchange station and a horizontal position at the printing station, and in that the holding means equipping each of the transfer arms comprises at least one clamp each of the two branches of which is fitted at its free end with a jaw adapted to surround at least partially, in conjunction with the jaw of the other, an object to be printed.

This advantageously results in a relatively simple assembly and in working rates that are relatively high, in the order of 2000 units per hour, for example, with a minimum number of moving parts.

The characteristics and advantages of the invention will emerge from the following description given by way of example with reference to the appended schematic drawings in which.

Figure 6:
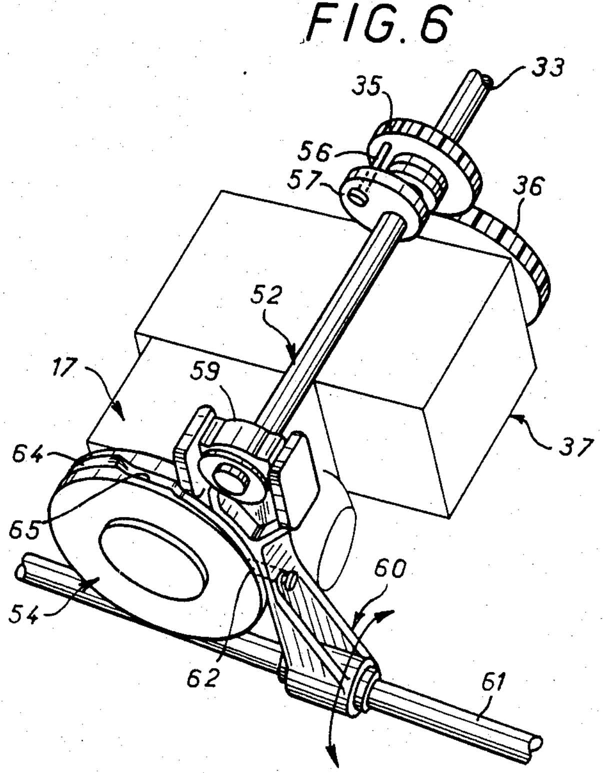
Figure 5:
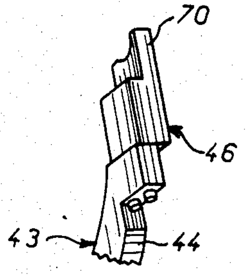
Figure 7:
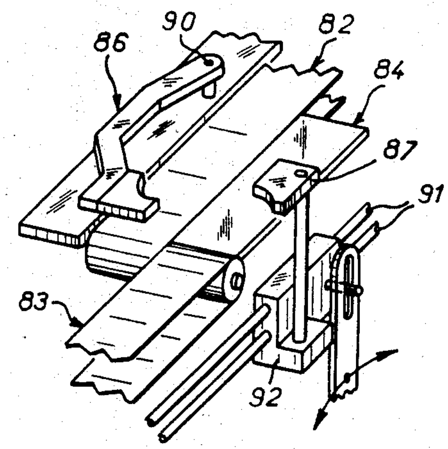
Figure 8B:
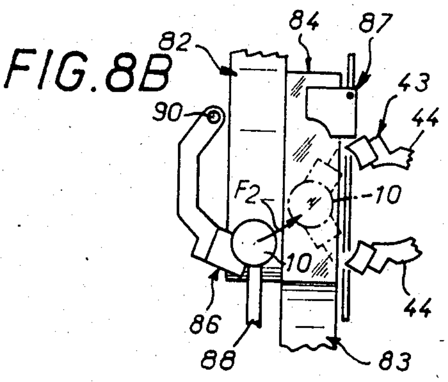
Figure 8A:
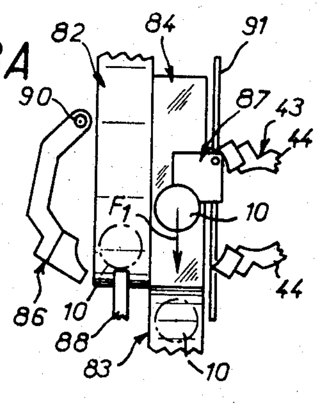

FIG. 5 isi a partial view in perspective of one of the branches of one of the clamps used in this printing machine, together with the jaw carried by this branch;

FIG. 6 is a partial view in perspective of the drive means of the printing machine in accordance with the invention;

FIG. 7 is a partial view in perspective of the conveyor means which the printing machine in accordance with the invention comprises;

FIGS. 8A and 8B are partial views in plan illustrating schematically various phases of operation of these conveyor means.

These figures illustrate by way of example the application of the invention to the processing of bottles 10 with a neck 11 and a bottom 12, glass bottles, for example.

It is a question, in practice, of servicing a printing station 13, functioning horizontally, from conveyor means 14 which as disposed at a level below that of the printing station 13 and on which the bottles 10 concerned are conveyed vertically.

By printing station functioning horizontally there is meant in this context a printing station in which the bottles 10 to be processed must be offered up horizontally in order to be printed.

This is the case, for example, with the printing station or stations of silkscreen printing machines.

As a printing station of this kind is well known of itself and does not of itself constitute the object of the present application, it will not be described in complete detail here.

Also, only some of its constituent parts, and these only in part, are shown in certain of the figures; this is the case, for example, with the arms 15 necessary to support the screen employed.

In practice, mention will only be made here of the components of the printing machine in accordance with the invention necessary for understanding the invention.

Thus at this point it will suffice to say that this printing machine comprises a frame, of which all components have been labelled without distinction by means of the same reference numeral 16 in the figures, that a drive motor-gearbox unit 17 (FIG. 6) is disposed within and protected by this frame and adapted to drive all the machine's members, and that with its printing station 13 there is associated a holding device 18 which, in order to grasp a bottle 10 to be printed and hold it during printing, between a cone and cup, comprises two members 19, 20 mounted mobile relative to each other in the direction towards each other.

For example, the first member 19 consists of a cone designed to contact the neck 11 of the bottle 10 to be printed, on the axis of the neck 11, and the second member 20 consists of a chuck, usually called the "cup" or "false cup", designed to contact the bottom 12 of a bottle 10, on the axis thereof.

In the embodiment shown, the chuck thus constituting the member 20 is mounted to rotate on the frame 16 of the machine and is driven, for example, by a belt 22 driven by the motor-gearbox unit 17; for the purpose of applying it to the bottom 12 of a bottle 10 to be printed, it is mounted to be movable along its axis on the frame 16 under the control of a lever 23 pivoted to the frame 16 at 24 and acted on at one end by a cam also driven by the motor-gearbox unit 17, its other end being engaged with an annular yoke 25 keyed axially to the chuck, by means of a roller it carries.

In practice this chuck is formed, on the one hand, by a tip 27 which is the part driven in rotation by the belt 22 and which carries a retractable projecting nipple designed to enter into a notch usually provided for this purpose on the bottom 12 of the bottles 10 to be printed, for the purpose of driving bottle 10 in rotation, and, on the other hand, around the tip 27, a sleeve 28 which, also projecting relative to the tip 27, forms the part thereof adapted to come into contact with the bottom 12, at its periphery.

Between the conveyor means 14 and the printing station 13 there is at least one transfer arm 31 which is provided, as will be described in more detail hereinafter, with holding means adapted to support a bottle 10 to be printed and which, mounted to rotate about an axis A inclined at 45° (FIG. 2), is adapted to occupy alternately two positions, one vertically aligned with the conveyor means 14 and the other vertically aligned with the printing station 13.

In practice, two identical transfer arms 31 are used, disposed at 90° to one another, one on each side of their common rotation axis A and in the same plane as the rotation axis A.

Each extends cantilever fashion from a head 32 which they also share and which, of generally cubical shape in the embodiment shown, is itself disposed at the end of and keyed to a support sleeve 33.

Figure 2:
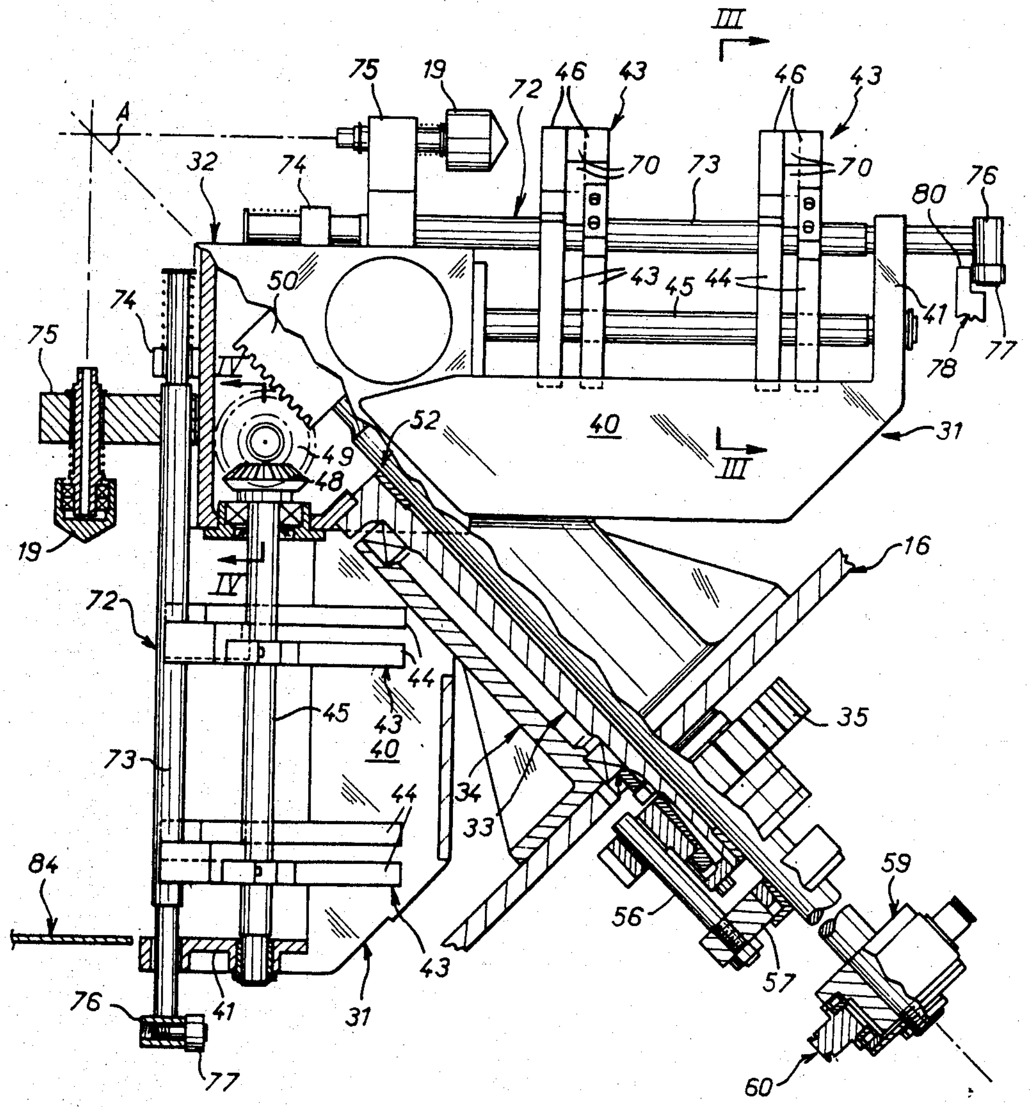
FIG. 2 is a view of this printing machine in lateral elevation and cross-section on the line II—II in FIG. 1.

This support sleeve 33, part of which is visible in FIG. 2, is mounted to rotate in a barrel 34 projecting perpendicularly from a panel of the frame 16 inclined at 45° and is keyed to a gearwheel 35 for driving it in rotation.

This gearwheel 35 meshes with a gearwheel 36 keyed to the output shaft of a register device 37 adapted to rotate it stepwise, 180° at a time, from the motor-gearbox unit 17 (FIG. 6).

In the embodiment shown, the overall configuration of each transfer arm 31 is that of a cradle, the transfer arm 31 comprising two side cheeks 40 each fixed at one end to the head 32 of the assembly and linked together at the other end by a transverse flange 41.

The holding means with which the transfer arm 31 is fitted comprises at least one clamp 43 the two branches 44 of which, each keyed to a respective one of two parallel drive shafts 45, are each provided at their free end with a jaw 46 adapted to at least partially surround, in conjunction with the jaw 46 of the other one, a bottle 10 to be printed.

In practice, two clamps 43 are used in this way, the clamps 43 being disposed parallel to one another and at a distance from one another, with their branches 44 each respectively keyed to the same drive shafts 45.

One of these clamps 43, namely that nearer the head 32 of the assembly, is intended to surround the neck 11 of a bottle 10 to be printed whereas the other, namely that farther away from the head 32, is designed to surround part of a bottle 10 near its bottom 12.

Be this as it may, their drive shafts 45 extend parallel to the cheeks 40 of the transfer arm 31 that they equip, from the head 32 of the assembly to the flange 41 of this transfer arm 31, each being mounted rotatably on this flange 41.

The drive shafts 45 mesh through bevel gears 48, 49 with a common gearwheel 50 which itself meshes with a rack 51 to which is rigidly attached a drive shaft 52 mounted to reciprocate along its axis under the control of a cam 54 (FIGS. 2, 3, 4 and 6).

In practice, for driving the drive shafts 45 of the two transfer amrs 31, the drive shaft 52 carries two racks 51 in back-to-back relationship at diametrically opposed positions, only one of these being visible in FIG. 2.

In practice also, the drive shaft 52 extends coaxially within the sleeve 33 to which the transfer arms 31 are keyed, being itself keyed to rotate with this sleeve 33.

For example, and as shown in FIGS. 2 and 6, the gearwheel 35 to which the sleeve 33 is keyed carries a projecting finger 56 and this is engaged with a plate 57 itself keyed to rotate with the drive shaft 52.

To reciprocate it along its axis the drive shaft 52 carries at its end an annular yoke 59 with which is engaged a lever 60 carried by a shaft 61 mounted so as to oscillate about its axis and carrying a peg 62, for example a roller mounted so as to be able to rotate, by means of which it is engaged with the cam 54.

In the embodiment shown, this cam 54 is a rotating cam which is driven by the motor-gearbox unit 17 and which has on its edge a double-track groove 64 in which is engaged the peg 62 carried by the lever 60.

The cam 54 is preferably, and as shown here, adapted to command two-stage opening of the clamps 43.

For this purpose the tracks constituting its groove 64 feature a slight flattening 65 intermediate their section which corresponds to the closed position of the clamps 43 and their section which corresponds to the fully open position thereof.

Because, like the sleeve 33 to which the transfer arms 31 are keyed, it is driven from the motor-gearbox unit 17, the resulting cam 54 is operated synchronously with the sleeve 33.

Like the motor-gearbox unit 17 and the register device 37, the cam 54 is of course disposed to the rear of the panel of the frame 16 inclined at 45° and carrying the barrel 34, the various members driving the drive shafts 45 of the transfer arms 31 (namely the racks 51, the gearwheel 50 common thereto and the corresponding bevel gears 48, 49) are disposed within the head 32 common to the assembly.

Each of the branches 44 of a clamp 43 preferably, and as shown here, features a bend 67 through which it extends around the outside the drive shaft 45 of the other branch.

In other words, each of the two branches 44 of a clamp 43, disposed generally symmetrically relative to each other in relation to a median plane perpendicular to the plane of their drive shaft 45, comprises a first section 68 which is in practice substantially rectilinear and by means of which is keyed to the drive shaft 45 which carries it and, beyond its bend 67, for supporting its jaw 46, a second section 69 in substantially V-configuration relationship to the preceding section, in practice slightly curved in the embodiment shown, and by means of which it extends around the drive shaft 45 carrying the other and associated branch 44, away from the latter, on the side of this drive shaft 45 diametrically opposite the drive shaft 45 which carries it.

An arrangement of this kind advantageously permits rapid separation of the two branches 44 of the same clamp 43 for a relatively moderate angle of rotation of their respective drive shafts 45.

Relative to the branch 44 which carries it, the active portion 70 at least of the jaw 46 of each of the branches 44 of a clamp 43 is preferably, and as shown in FIG. 5, offset in the direction towards the other branch 44, parallel to the corresponding drive shafts 45, so that the active portions 70 at least of the jaws 46 in question of the two branches 44 face each other transversely.

By virtue of an arrangement of this kind, when the branches 44 of a clamp 43 grip a bottle 10 to be printed there is no resulting tendency of the latter to tilt.

The branches 44 of each of the clamps 43 are, of course, mounted so as to be adjustable in position both longitudinally, that is to say axially, and angularly on their respective drive shafts 45.

Their corresponding end forms for this purpose a yoke by which it is clamped to a drive shaft of this kind by means of a clamping screw, for example.

Also, each transfer arm 31 carries a member 19 forming a cone.

Thus a member 19 of this kind, which forms part of the holding device 18 needed at the printing station 13, is carried by the transfer device 30 in accordance with the invention whereas the other member 20 with which it is associated remains at the printing station 13.

In practice, for each of the two transfer arms 31 employed the member 19 is fastened to a support 72, being mounted elastically thereon, and the support 72 extends generally parallel to the corresponding drive shafts 45.

In the embodiment shown, a support 72 of this kind is formed by two parallel shafts 73 slidably mounted on the transfer arm 31 that they equip, sliding for this purpose through the flange 41 thereof and a fixed link 74 carried by the head 32.

In their median area these shafts 73 carry a block 75, the position of which is adjustable, for supporting the member 19 concerned forming a cone.

At their end they are linked together by a crossmember 76 and, by means of this, they carry a finger 77, in practice a roller, through which they are adapted to be acted on by a control device 78 adapted to cause them to move parallel to the corresponding drive shafts 45.

This control device 78, which is provided at the printing station 13, comprises a pillar 79 which has in its upper part a trapezium-shaped profiled head 80 adapted to cooperate with the finger 77 of a support 72 and which is movably mounted by its lower part on a support block 81, being coupled by a link that is not visible in the figures to the lever 23 also controlling the associated member 20 forming a chuck, but at the end of this lever 23 opposite that by which the lever is actually adapted to operate on a member 20 of this kind.

Thus any tilting motion of the lever 23 causes displacement in one direction of the element 20 forming a chuck and displacement in the opposite direction of the pillar 79, and thus through the latter of the support 72 carrying the member 19 forming a cone present at this time at the printing station 13.

As it is easy to understand, the trapezium-shape of the head 80 of the pillar 79 facilitates its engagement in relation to the finger 77 of a support 72 of this kind.

The conveyor means 14 comprise at least one conveyor and there is associated with them, in vertical alignment with the printing station, an exchange station 84 substantially level with the conveyor and extending laterally relative to it.

In the embodiment shown, the conveyor means 14 comprises two separate conveyors 82, 83, one for input and the other for output, offset relative to each other but substantially level with each other, and the exchange station 84, which is disposed laterally relative to the input conveyor 82, is disposed at the head of the output conveyor 83.

In practice the exchange station 84 merely consists of a fixed plate attached to the frame 16.

As shown here, the conveyors 82, 83 may for example be parallel run conveyors passing in endless loops around direction changing members at least one of which is driven.

Be this as it may, they must be adapted to convey vertically the bottles 10 to be printed and, for the purpose of guiding the bottles, guides 85 may be associated with them laterally, as shown.

At the outlet end from the input conveyor 82 is an abutment member 88 for retaining the bottles 10 that it carries.

In combination with the fixed plate constituting the exchange station 84, there is provided on the one hand a first transfer means 86 adapted to pass a bottle 10 to be printed from the input conveyor 82 to the exchange station 84, in order for this bottle 10 to be printed to be grasped by a transfer arm 31, and on the other hand a second transfer means 87 adapted to pass from the exchange station 84 to the output conveyor 83 an object 10 already printed, previously put down by a transfer arm 31.

In the embodiment shown, the first transfer means 86 is a pusher formed by an arm substantially parallel to the input conveyor 82 and thus to the conveyor means 14 and disposed to rotate to-and-fro about an axis substantially perpendicular to the plane of the fixed plate constituting the exchange station 84, whereas the second transfer means 87 is a pusher that reciprocates parallel to the output conveyor 83 and thus to the conveyor means 14.

In practice, the two pushers 86, 87 are of course driven synchronously with the transfer device 30.

For example, the pusher 86 may be keyed in rotation to a support shaft 90 which, through the intermediary of a linkage that is not shown, is driven alternatingly by a pneumatic actuator, also not shown, the supply of air to which is conditioned by a cam operated synchronously from the motor-gearbox unit 17.

Conjointly, and as shown in FIG. 7, the pusher 87 may be carried by a support block 92 which slides on guides 91 parallel to the output conveyor 83 and is also subjected to the action of a cam driven from the motor-gearbox unit 17, through the intermediary of a linkage which is not shown in full.

The pusher 86 is preferably, and as shown here, broadly curved so as not to interfere with the bottle 10 immediately upstream of that which it has to push.

In operation, the sleeve 33 to which are keyed the transfer arm 31 turns stepwise in steps of 180°.

Thus the transfer arms 31 occupy alternately a vertical position in vertical alignment with the fixed plate constituting the exchange station 84 and a horizontal position parallel to the member 20 forming a chuck of the holding device 18 present at the printing station 13.

Figure 1:
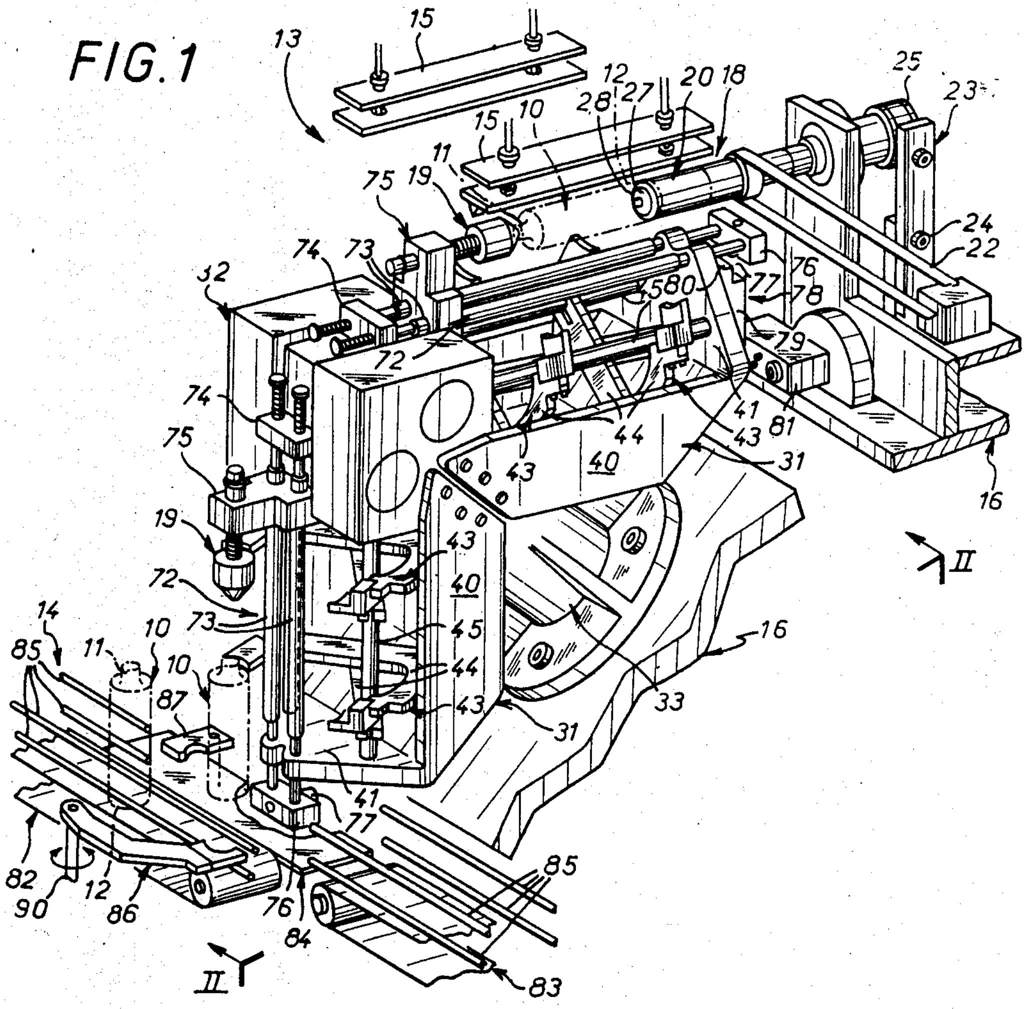
FIG. 1 is a partial perspective view of a printing machine in accordance with the invention.
Figure 3:
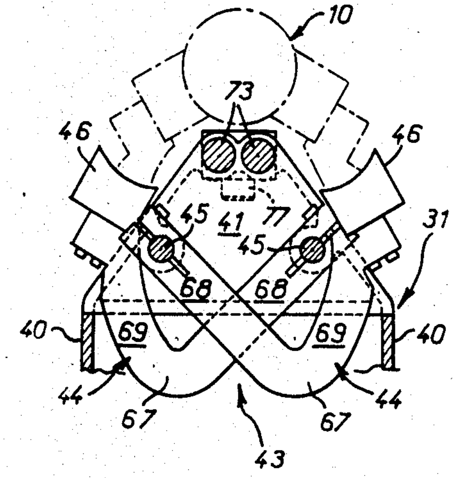
FIGS. 3 and 4 are partial views of it in transverse cross-section, on the respective lines III—III and IV—IV in FIG. 2.
Figure 4:
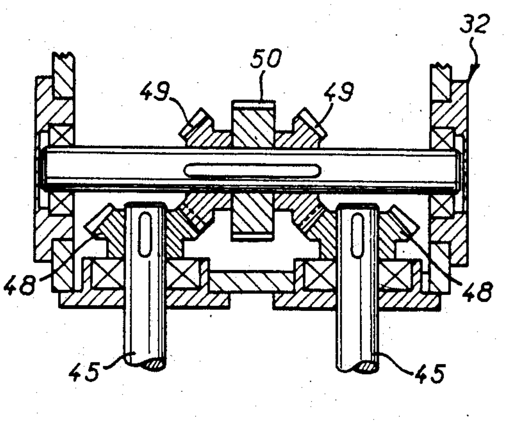

For each position of a transfer arm 31 of this kind the clamps 43 with which the transfer arm 31 is equipped are themselves adapted to pass alternately between an open position shown in full line in FIGS. 3, 8A, 8B in which, broadly separated from each other, their branches are not likely to interfere with any bottle 10 present at this location, and a closed position schematically represented in dashed line in FIGS. 3 and 8B in which, on the other hand, their branches close around and encircle a bottle 10.

In practice, the bottle 10 carried by a transfer arm 31 is disposed substantially tangentially to the fixed plate constituting the exchange station 84 on rotation of the assembly around the axis A.

Each time the transfer arms 31 stop, the following occurs in succession for the one which is vertically aligned with the fixed plate 84: a previously printed bottle 10 is deposited on the plate by the clamps 42 of this transfer arm opening (FIG. 8A), then this bottle 10 passes from the fixed plate 84 to the output conveyor 83, because of the action of the pusher 87, as schematically represented by the arrow F1 in FIG. 8A, then due to the action of the pusher 86 and as schematically represented by the arrow F2 in FIG. 8B, a new bottle 10 to be printed, halted by the abutment member 88, passes from the input conveyor 82 to the fixed plate 84, and finally this bottle 10 is grasped by the transfer arm 31 in question, by the clamps 43 thereof closing around it.

As the depositing of an already printed bottle 10 and the grasping of a bottle 10 to be printed occur in this way on a fixed plate 84, these operations are carried out in complete safety, the bottles 10 concerned necessarily being immobile on a plate 84 of this kind.

As a corollary to this, on each half, there occurs in succession, for the transfer arm 31 which occupies a horizontal position in vertical alignment with the printing station 13, release of the bottle 10 that it carries, by its clamps 43 opening, in conjunction and substantially concomitantly with grasping of this bottle 10 between the members 19, 20 of the holding device 18, under the control of the lever 23 and in accordance with the process previously described hereinabove, and finally, after printing of the bottle 10, a new closing of the clamps 43 thereon.

As mentioned hereinabove, the opening of the clamps 43 on releasing the bottle 10 for printing it advantageously occurs in two stages.

During the first stage the clamps 43 merely open enough to release the bottle 10 sufficienty for the members 19, 20 of the holding device 18 to be operative on it without the bottle 10 being actually released by the clamps 43, with the attendant possibility of escaping from them and falling off.

The clamps 43 then open completely during a second stage.

Such gradual opening of the clamps 43 of the transfer arms 31 provides the advantage of reconciling two requirements, one relating to the safety in operation of the printing station while providing for the compensation of any misalignment between the bottle 10 to be printed and the members 19, 20 of the holding device 18 that has to take it in charge and/or the compensation of possible dimensional irregularities from one bottle 10 to another, and the other requirement relating to sufficient opening of the clamps 43 at the fixed plate 84 to permit unrestricted circulation on the latter of a bottle 10 already printed without risk of interference with such clamps 43.

As will have been understood, the positional adjustment of the branches 44 constituting the clamps 43 on their drive shafts 45, with regard to their longitudinal position along it and their angular position relative to it, provides a very simple means of carrying out the necessary positional adjustments for adapting the assembly to the dimensional characteristics specific to the bottles 10 to be processed.

The present invention is, of course, not limited to the embodiment described and shown, but encompasses any variant execution, in particular with regard to the conveyor means and/or the transfer means which are associated with the conveyor means for the purpose of servicing the exchange station.

In the case of the conveyor means, for example, a single conveyor may be provided.

Also, either member of the holding device employed may be carried by each of the transfer arms.

Finally, the field of application of the printing machine in accordance with the invention is not necessarily limited to printing bottles, and a fortiori glass bottles, for which use it is nevertheless more particularly intended and with reference to which use it has been more specifically described, but on the other hand it may extend just as well, more generally, to printing any kind of object.

Whatever else may apply, the cross-section of the objects to be printed is not necessary circular.

What we claim is:

1. Printing machine of the kind comprising a horizontal printing station co-operating with conveyor means disposed at a level below that of said printing station and at least one transfer arm which is equipped with holding means adapted to support an object to be printed and which, mounted to rotate about an axis inclined at 45, is able to occupy alternately two positions, one in vertical alignment with the conveyor means and the other in vertical alignment with the printing station, in combination with, on the one hand, a first transfer means adapted to pass an object to be printed from said conveyor means onto an exchange platform, in order for the object to be printed to be grasped by the transfer arm, and, on the other hand, a second transfer means adapted to pass from the exchange platform to the conveyor means an object already printed previously put down by the transfer arm, characterized in that there are two rotatable transfer arms having a common rotation axis and disposed at 90 relative to each other, one on each side of their common rotation axis and in a plane containing the latter, and which alternately occupy a vertical position on the exchange platform and a horizontal position at the printing station, and each of the transfer arms having holding means which comprises at least one transverse clamp having two transverse branches each of which is fitted at a free end with a jaw adapted to surround at least partially, in conjunction with the jaw of the other branch, an object to be printed.

2. Printing machine according to claim 1, characterized in that the conveyor means comprise at least one conveyor and the exchange platform extends laterally relative to said conveyor, substantially level therewith.

3. Printing machine according to claim 2, characterized in that the conveyor means comprise two conveyors, an input one and an output one, which are offset relative to one another but substantially level with one another, and the exchange platform, which extends laterally relative to the input conveyor, is disposed at the head of the output conveyor.

4. Printing machine according to claim 2, characterized in that the exchange platform is in the form of a simple fixed plate.

5. Printing machine according to claim 1, characterized in that the first transfer means is a pusher formed by an arm substantially parallel to the conveyor means and mounted to rotate to-and-fro about an axis substantially perpendicular to the plane of the exchange station.

6. Printing machine according to claim 5, wherein the second transfer means is a pusher reciprocable parallel to the conveyor means, and the two transfer means are driven synchronously with the transfer arm.

7. Printing machine according to claim 1, characterized in that the second transfer means is a pusher that can be reciprocated parallel to the conveyor means.

8. Printing machine according to claim 1, characterized in that the two transfer means are both driven synchronously with the transfer arm.

9. Printing machine according to claim 1, characterized in that the two branches of the clamp are keyed to respective and parallel drive shafts.

10. Printing machine according to claim 1, characterized in that the two branches of the clamp are keyed to respective and parallel drive shafts, and each of the branches of the clamp features a bend by means of which it extends around the outside of the drive shaft of the other of said branches.

11. Printing machine according to claim 10, characterized in that the holding means equipping a transfer arm comprise two clamps disposed parallel to one another at a distance from one another.

12. Printing machine according to claim 10, characterized in that the holding means equipping a transfer arm comprise two clamps disposed parallel to one another at a distance from one another, and in that the branches of the clamps are respectively keyed to the same drive shafts.

13. Printing machine according to claim 1, characterized in that the two branches of the clamp are keyed to respective and parallel drive shafts, and relative to the branch that carries it, the active portion at least of the jaw of each of the branches of the clamp protrudes in the direction towards the other of said branches and is offset parallel to the general plane of the corresponding branch so that the active portions at least of the jaws of the two branches are aligned transversely with each other.

14. Printing machine according to claim 1, characterized in that the two branches of the clamp are keyed to respective and parallel drive shafts, and for the purpose of driving them, the drive shafts of the branches of the clamp mesh via bevel gears with a common gearwheel which meshes with a rack to which is fastened a drive shaft disposed to reciprocate along its axis under the control of a cam.

15. Printing machine according to claim 14, characterized in that said cam is adapted to command two-stage opening of the clamp.

16. Printing machine according to claim 14, characterized in that the reciprocable drive shaft of the clamp extends coaxially inside a sleeve which is rotatably mounted and said reciprocable drive shaft being fixed for rotation with the corresponding transfer arm and said sleeve.

17. Printing machine according to claim 14, characterized in that the reciprocable drive shaft of the clamp extends coaxially inside a sleeve which is rotatably mounted, said reciprocable drive shaft being fixed for rotation with the corresponding transfer arm and said sleeve, said cam being mounted rotatably, and said sleeve and said cam being driven synchronously.

18. Printing machine according to claim 1, characterized in that, a two-member holding device is associated with the printing platform for grasping an object to be printed and holding it during printing, one of said members being provided on each of the transfer arms whereas the other of said members remains at the printing platform.

19. Printing machine according to claim 18 wherein said two-member holding device is of the cone and cup type.

20. Printing machine according to claim 1, characterized in that, a two-member holding device is associated with the printing platform for grasping an object to be printed and holding it during printing, one of said members being provided on each of the transfer arms whereas the other of said members remains at the printing platform, and in that both members of the holding device are mounted so as to move relative to one another, towards one another, said clamp having a drive shaft, and that on said transfer arm is fastened a support which extends parallel to the drive shaft of the clamp and which support carries at its end a finger through which it is adapted to be acted on by a control device adapted to cause it to move parallel to said drive shaft.

21. Printing machine according to claim 20 wherein said two-member holding device is of the cone and cup type.

22. Printing machine according to claim 1, wherein the two branches of the clamp are keyed to respective parallel drive shafts, an active portion of the jaw of each of branches of the clamp protrude in the direction of the other of the branches, and the active portion of one of the jaws is offset parallel to the general plane of its branch so that the active portions of the jaws are transversely aligned with each other.

23. Printing machine according to claim 1, wherein there are only two said transfer arms.

* * * * *